United States Patent [19]

Van Der Valk

[11] Patent Number: 4,479,141
[45] Date of Patent: Oct. 23, 1984

[54] COLOR TELEVISION CODING CIRCUIT
[75] Inventor: Nicolaas J. L. Van Der Valk, Breda, Netherlands
[73] Assignee: U.S. Philips Corporation, New York, N.Y.
[21] Appl. No.: 370,894
[22] Filed: Apr. 22, 1982
[30] Foreign Application Priority Data May 29, 1981 [NL] Netherlands .................. 8102618

[51] Int. Cl.³ ............................................. H04N 9/38
[52] U.S. Cl. ........................................ 358/12; 358/19
[58] Field of Search ...................... 358/12, 17, 19, 30, 358/40, 14, 15, 16

[56] References Cited
U.S. PATENT DOCUMENTS 4,200,881 4/1980 Carnt ..................................... 358/19

Primary Examiner—Michael A. Masinick
Attorney, Agent, or Firm—Thomas A. Briody; William J. Streeter; Charles E. Quarton

[57] ABSTRACT

NTSC-color television coding circuit comprising a series arrangement formed by a color difference signal matrix circuit, an I-signal and Q-signal matrix circuit, two low-pass filters, a modulator circuit and a superposition stage for supplying a quadrature-modulated chrominance signal. In order to obtain the chrominance sub-carrier burst in the chrominance signal, a burst-gate signal the pulse leading edge of which is produced before the beginning of the burst, is added to the $-(B-Y)$ color difference signal. The chrominance signal in which the prolonged burst is distorted at the beginning by the filter is applied to a signal blanking circuit in which the distorted beginning is blanked and the burst in accordance with the standard is present in the chrominance signal obtained. Now, the burst amplitude can be adjusted, without a phase shift, by means of one potentiometer.

3 Claims, 1 Drawing Figure

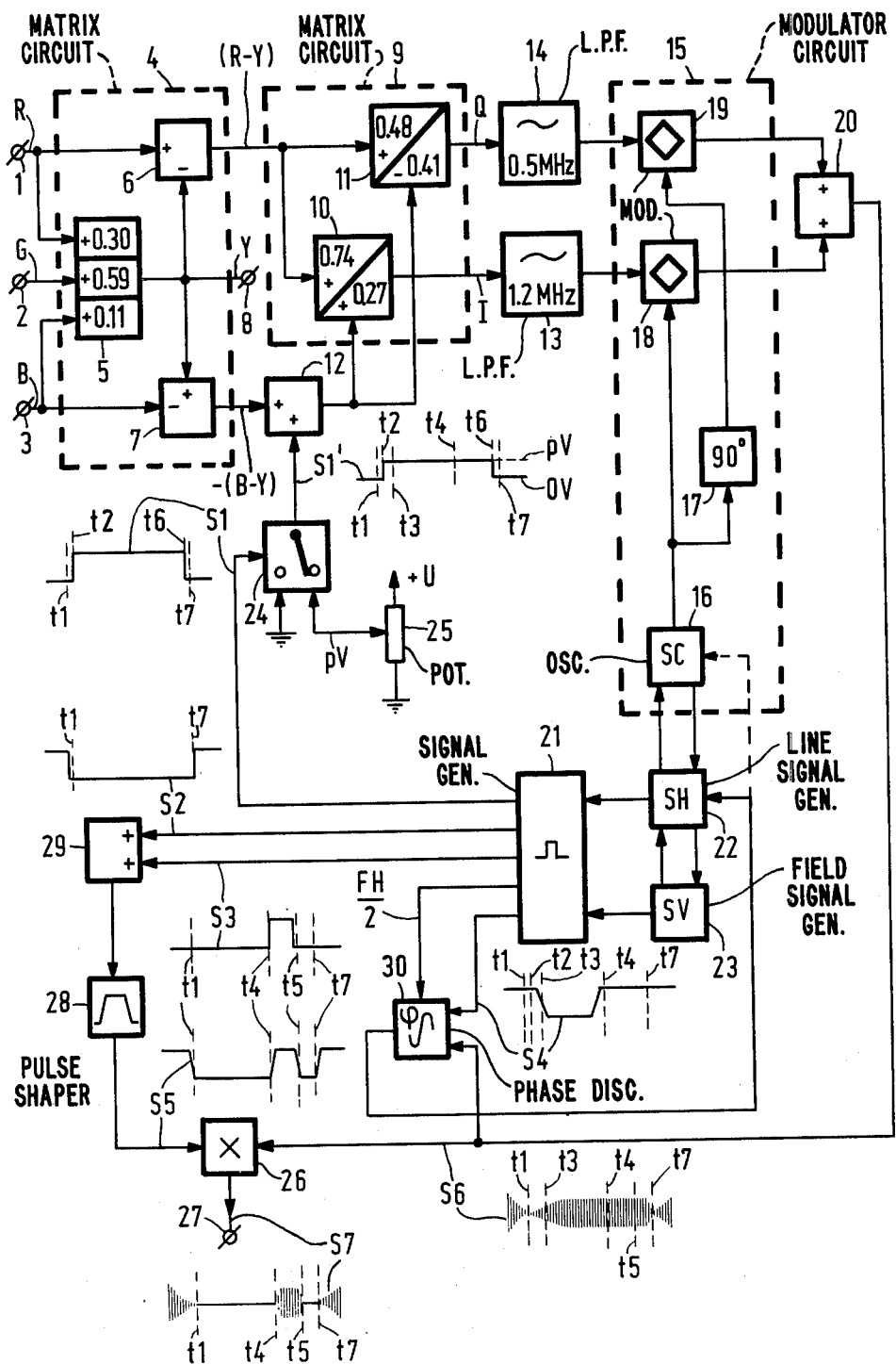

COLOR TELEVISION CODING CIRCUIT

BACKGROUND OF THE INVENTION

The invention relates to a colour television coding circuit suitable for use in a colour television system in accordance with the NTSC standard, the coding circuit comprising a series arrangement formed by a first matrix circuit for forming colour difference signals, a second matrix circuit for forming standardized I- and Q-signals therefrom, first and second low-pass filters following the second matrix circuit and having different frequency passbands for the I- and the Q-signal, respectively, a modulator circuit following the filters for quadrature modulation of a chrominance subcarrier by the frequency-limited I- and Q-signals and a first superposition circuit following the modulator circuit for forming a chrominance signal from the modulated signal, the coding circuit further comprising a second superposition circuit for inserting a burst-gate signal into the series arrangement for obtaining in a chrominance signal occurring at a coding circuit output a burst of the chrominance subcarrier during a standardized period of time.

Such a coding circuit is described in the book "Television Engineering Handbook", by D. G. Fink, first edition 1957, pages 9-42 to 9-45, inclusive. In the described implementations of the coding circuit, the burst-gate signal of a fixed duration for obtaining the standardized chrominance subcarrier burst in the chrominance signal is used during signal processing in the series arrangement after the low-pass filters. Should this not be done, and the burst-gate signal were inserted before the filters in the series arrangement, the result would be that the steepness of the pulse edges in the burst-gate signal is smoothed to an impermissible extent. Seeing that the pulse edge steepness' attenuation by the I-signal filter having a frequency passband of 0 to 1.2 MHz is already impermissible, then this is certainly the case for the Q-signal filter having a frequency passband of 0 to 0.5 MHz. An advantage of inserting the burst-gate signal before the low-pass filters in the series arrangement is the presence of the signal before the said second matrix circuit for forming the I- and Q-signals. The burst-gate signal might then be inserted into one of the colour difference signals, more specifically in anti-phase in the colour difference signal (B−Y), as a result of which the burst-gate signal thus inserted in the proper phase may be matrixed in the I- and Q-matrix circuit, and the burst-gate signal components might here and in the modulator circuit maintain the proper phase relationship and ultimately result in a chrominance subcarrier burst in the chrominance signal with the proper phase and amplitude.

SUMMARY OF THE INVENTION

It is an object of the invention to provide a colour television coding circuit which has the above-described advantage. According to the invention, a coding circuit is characterized in that in the presence of the second superposition circuit for inserting the burst-gate signal before the second matrix circuit and the subsequent low-pass filters in the series arrangement, the duration of the inserted burst-gate signal is longer than the standardized duration of the chrominance subcarrier burst in the chrominance signal at the coding circuit output because the occurrence of the pulse leading edge of the burst-gate signal in the line blanking period is advanced, the coding circuit incorporating a signal blanking circuit having a first input for receiving the chrominance signal produced by the first superposition circuit, a second input for receiving a blanking signal which is active in a standardized line blanking period outside the standardized duration contained therein for the burst, and an output connected to the coding circuit output for supplying the chrominance signal with the chrominance subcarrier burst during the standardized period of time.

The invention is based on the recognition of the fact that it is possible to insert the burst-gate signal into the series arrangement before the low-pass filters if the pulse leading edge of the burst signal is inserted prior to the instant at which the standardized chrominance carrier burst occurs in the chrominance signal and by thereafter removing by means of signal blanking that (distorted) portion of the chrominance subcarrier burst obtained at the output of the first superposition stage which is too early for the standard. As a result thereof the edge steepness attenuation of the pulse leading edge of the burst-gate signal, which attenuation is caused by the low-pass filters, is not expressed in the chrominance subcarrier burst which is ultimately obtained after signal blanking.

With the coding circuit in accordance with the invention it is easy to satisfy a further condition, of the present standard which requires that the envelope of the chrominance subcarrier burst must have a predetermined variation. A coding circuit in accordance with the invention is characterized in that the blanking signal comprises a pulse having a duration equal to the standardized duration of the chrominance subcarrier burst, the pulse leading edge and the pulse trailing edge having a predetermined pulse edge steepness which corresponds to the beginning and the end of the standardized envelope of the chrominance subcarrier burst. Also a further condition of the present standard, can easily be satisfied by means of a coding circuit in accordance with the invention. Said condition prescribes a phase relationship between the 50% point of the leading edge of the horizontal or line synchronizing pulses and the chrominance subcarrier. This phase relationship must be such that at this 50% point the chrominance subcarrier passes through zero, it holding that for two consecutive line periods in one field period the zero passage must be in an opposite direction, that is to say alternately in the positive and the negative direction. An embodiment of a colour television coding circuit in accordance with the invention which is suitable therefor, is characterized in that the burst-gate signal to be applied to the second superposition circuit has a pulse the leading edge of which is present in the line blanking period prior to the standardized time for the leading edge of a standardized line synchronizing pulse, the coding circuit comprising a phase discriminator which is active once in every two line periods and which has a first comparison input for receiving the chrominance signal to be produced by the first superposition circuit, a second comparison input for receiving a line synchronizing signal having line synchronizing pulses, and an output connected to a control input of a line signal generator and a subcarrier oscillator coupled therewith which is present in the modulator circuit, respectively.

Colour television apparatus comprising a colour television coding circuit in accordance with the invention may, for example, be in the form of a colour television camera suitable for the NTSC-system, or a transcoding device where signals which have been coded in accordance with a different standard, can be coded in accordance with the NTSC standard, after having been decoded.

BRIEF DESCRIPTION OF THE DRAWING

The invention will now be further described by way of non-limitative example with reference to the accompanying FIGURE, the FIGURE showing by means of a block schematic circuit diagram an embodiment of a NTSC colour television coding circuit in accordance with the invention.

DESCRIPTION OF THE PREFERRED EMBODIMENT

In the Figure reference numerals 1, 2 and 3 denote three inputs of the coding circuit. Colour signals R, G and B are, for example, applied to the respective inputs 1, 2 and 3, which signals correspond to red, green and blue light, respectively coming from a scene recorded by a television camera, not shown. The respective colour signals R, G and B are applied to a first matrix circuit 4 via the inputs 1, 2 and 3. In the matrix circuit 4 the signals R, G and B are applied to a superposition circuit 5 in which a luminance signal Y is produced for which it holds that $Y=0.30R+0.59G+0.11B$. The matrix circuit 4 further comprises two superposition circuits 6 and 7, the circuit 6 has a (+) input for receiving the signal R and a (−) input for receiving the signal Y, causing the output thereof to carry a colour difference signal (R−Y). The circuit 7 has a (−) input for receiving the signal B and a (+) input for receiving the signal Y, in response to which its output carries a colour difference signal −(B−Y). The output of the circuit 5 carrying the luminance signal Y is connected to an output 8 of the coding circuit. In customary manner the output 8 may be followed by circuits, not shown, for the further processing of the luminance signal Y. Instead of colour signals, it is alternatively possible to apply a different signal combination (for example Y, R and B) to the first matrix circuit 4, it only being essential that the first matrix circuit 4 supplies colour difference signals. Independent of which specific signal is applied, it is assumed that the applied signals have been subjected to the signal processing operations which are customary in practice.

The colour difference signal (R−Y) is applied to a second matrix circuit 9, more specifically to (+) inputs of two superposition circuits 10 and 11, incorporated therein. The colour difference signal −(B−Y) is not directly applied to the circuit 9 but it is first applied to a (+) input of a superposition circuit 12, a signal, still further to be described, being applied to a second (+) input thereof. The output of the superposition circuit 12 is connected to the matrix circuit 9 in such a way that in this matrix circuit it is connected to a (+) input of the circuit 10 and to a (−) input of the circuit 11. The superposition circuit 10 then supplies the signal which is commonly referred to as the I-signal for which it holds that $I=0.74(R−Y)−0.27(B−Y)$. The superposition circuit 11 then supplies a signal which is commonly referred to as the Q-signal for which it holds that $Q=0.48(R−Y)+0.41(B−Y)$. These I- and Q-signals are part of the NTSC-television standard.

The I-signal and the Q-signal, respectively, produced by the matrix circuit 9 is applied to respective inputs of a modulator circuit 15, via a low-pass filter 13 and 14, respectively having a respective frequency passband of 0 to 1.2 MHz and 0 to 0.5 MHz. In the FIGURE the modulator circuit 15 is shown in its simplest form by means of a block schematic circuit diagram, signal clamping circuits, delay time correction circuits, filters etc. not being shown. The modulator circuit 15 comprises a subcarrier oscillator 16 (SC) which is connected directly and via a phase shifter 17 having a phase shift equal to 90° to an input of respective modulators 18 and 19. The frequency-limited I-signal and Q-signal, respectively, is applied to a further input of the respective modulators 18 and 19. The outputs of the modulators 18 and 19 constitute the outputs of the modulator circuit 15 and are connected to respective (+) inputs of a superposition circuit 20. The output of the circuit 20 carries a chrominance signal in which the frequency-limited I- and Q-signals are present after quadrature modulation of the chrominance subcarrier. The first and second matrix circuits 4 and 9, respectively, the first and the second low-pass filter 13 and 14, respectively, the modulator circuit 15 and the superposition circuit 20 form a series arrangement (4, 9, 13, 14, 15, 20) which is known in practice for forming from the colour signals R, G and B the quadrature modulated chrominance signal occurring at the output of the circuit 20, which chrominance signal is part of the NTSC standard, but which does not contain the further prescribed chrominance subcarriers burst used for reference purposes on the signal demodulation. In practice said burst in the chrominance signal is usually obtained by inserting a burst-gate signal into the series arrangement (4, 9, 13, 14, 15, 20), more specifically between the low-pass filters 13 and 14 and the modulator circuit 15. Insertion of the burst-gate signal before the filters 13 and 14 is not done in practice, as the filters 13 and 14, particularly filter 14, would result in an impermissible smoothing of the pulse leading edge of the burst-gate signal. In opposition to the described practice, a burst-gate signal is inserted before the filters 13 and 14 in the coding circuit in accordance with the invention, and processed by the superposition circuit 12. It is then essential to insert a burst-gate signal which has a determined pulse duration. In order to obtain the burst-gate signal and further signals still to be described hereinafter, the coding circuit incorporates a signal generator 21. Inputs of the generator 21 are connected to outputs of a line signal generator 22 (SH) and a field signal generator 23 (SV), which are intercoupled. The line signal generator 22 and the subcarrier oscillator 16 are also intercoupled.

At a number of outputs the signal generator 21 supplies signals which in the FIGURE are denoted by S1 to S4, inclusive and are shown as a function of time. Consecutive instants are denoted by t1 to t7, inclusive. In addition derived pulse-shaped signals are denoted by S1′ and S5. The chrominance signal produced by the superposition circuit 20 is designated S6 and a chrominance signal derived therefrom and which perfectly satisfies the NTSC standard is designated S7. Signal (FH/2) at an output of the generator 21 is a signal, not further shown, of half the line frequency. The signals S1′ and S1 to S7, inclusive are shown in the region of a periodically occurring line blanking period having a duration from t1 to t7.

The signal S1′ is the burst-gate signal which in accordance with the invention must be inserted into the series arrangement (4, 9, 13, 14, 15, 20) and it is applied to the (+) input of the superposition circuit 12, shown next to it. The signal S1′ is produced by, for example, a switching arrangement 24. In the drawing the arrangement 24 has a switching signal input to which the signal S1 coming from the generator 21 is applied and two signal inputs, one of which is connected to ground and the other to the tap of a potentiometer 25. The potentiometer 25 is provided between ground (OV) and a terminal carrying a voltage +U coming from a voltage source, not shown. The adjustable voltage is denoted by pV at the potentiometer tap. Under the control of the signal S1 the arrangement 24 applies the burst-gate signal S1' to the circuit 12. A pulse having a duration from t2 to t6 is shown in the signal S1'. Essentially, the pulse leading edge at the instant t2 is produced plenty of time before the instant t4, it being a definite advantage if it is present before the instant t3. The instant t4 is the standardized starting moment of the chrominance subcarrier burst (in signal S5) and the instant t3 corresponds to the 50% point of the leading edge of the line synchronizing pulse (in signal S4). The instant t2 must then occur after the starting instant t1 of the line blanking period and the instant t6 must be located after the final instant t5 of the burst (in signal S5) and before the final instant t7 of the line blanking period. The pulse in the signal S1' then has a value pV which is adjusted so that the subcarrier amplitude has the standardized value, between the instant t2 and t6 for the major part, and definitely between the instants t4 and t5 in the chrominance signal S6. Advantageously a change in the value pV by means of the potentiometer 25 affects only the subcarrier amplitude and not the phase, so that the burst-amplitude can be adjusted without a phase shift.

Inserting the signal S1' with the time-advanced pulse leading edge at the instant t2 shown in the drawing results in the elimination of the pulse edge steepness attenuation caused by the low-pass filters 13 and 14 before the instant t4, so that the carrier amplitude in the signal S6 (from t4 to t5) has the standardized value. On the other hand, at the instant t3, the carrier is present, (for example with an attenuated amplitude) in the signal S6 and can then be employed in a manner still to be described for synchronizing purposes.

To obtain the chrominance signal S7 the NTSC standard, the signal S6 is applied to an input of a signal blanking circuit 26, which is in the form of a multiplier circuit. The output of the circuit 26 is connected to the output 27 of the coding circuit for supplying the standardized chrominance signal S7 for further processing. Applied to a further input of the circuit 26 is the signal S5 which is supplied via a pulse edge shaper 28 by a superposition circuit 29 to (+) inputs of which the signals S2 and S3, coming from the signal generator 21, are applied. For an embodiment of the pulse edge shaper 28 and the signal blanking circuit 26 in the form of a multiplier circuit reference is made to U.S. Pat. No. 3,912,864.

The signal S5 is a blanking signal in which the pulse edges have a predetermined pulse edge steepness as described in the NTSC standard. At the instants t1 and t7 pulse edges are produced which are associated with the standardized line blanking. At the instants t4 and t5 pulse edges occur for a pulse having a duration from t4 to t5 equal to the standardized duration of the chrominance subcarrier burst, the pulse leading edge (instant t4) and the pulse trailing edge (instant t5) having a pulse edge steepness corresponding to the beginning and the end of the standardized envelope of the burst. Multiplication of the signals S5 and S6 results in the signal S7 shown in the drawing, which fully satisfies the requirements of the standard.

In accordance with one aspect of the invention the coding circuit incorporates a phase discriminator 30. A first comparison input of the discriminator 30 is connected to the output of the circuit 20, which produces the signal S6. A second comparison input of the discriminator 30 is connected to the output of the signal generator 21 which output carries the signal S4. A control input of the discriminator 30 receives a signal of half the line frequency (FH/2), as a result of which the discriminator 30 is operative once in every two line periods. For a possible embodiment of the discriminator 30 reference is made to U.S. Pat. No. 4,278,994.

The output of the discriminator 30 is connected to a control input of the line signal generator 22 and the subcarrier oscilator 16 coupled thereto, respectiely. When a stable oscillator is used, the discriminator signal is preferably applied to the generator 22.

A synchronizing pulse having an instant t3 at which the 50% point of the leading edge is present is shown in the signal S4 which acts as the line synchronizing signal. The (attenuated) subcarrier is present in the chrominance signal S6 at and around the instant t3. Once in every two line periods the phase of the subcarrier is determined in the discriminator 30 at the instant t3, a phase deviating from zero resulting in a readjustment of the line signal generator 22 by a shift of the line synchronizing pulse until the 50% point thereof coincides with the phase zero of the subcarrier. This readjustment once every two line periods occurs since, in accordance with the standard for two consecutive line periods, the passage through zero must proceed in opposite directions, alternately in the positive and the negative direction.

The burst-gate signal S1' is added in the embodiment shown in the FIGURE to the colour difference signal $-(B-Y)$. It is alternatively possible to perform a signal subtraction at the colour difference signal $(B-Y)$. In addition, a burst-gate signal intertion may be effected at the colour difference signal $(R-Y)$ when this signal is subjected in the line blanking period to a phase shift of $+90°$ or $-270°$.

The television coding circuit shown in the FIGURE may be part of a colour television camera suitable for the NTSC standard. The circuit may further be incorporated in a transcoding apparatus, where signals which were coded in accordance with a different standard, may be coded in accordance with the NTSC-standard, after decoding. In both above-mentioned and other cases of colour television equipment the coding circuit may be used with advantage.

What is claimed is:

1. A colour television coding circuit suitable for use in a colour television system in accordance with the NTSC-standard, the coding circuit comprising a series arrangement formed by a first matrix circuit for forming colour difference signals, a second matrix circuit for forming standardized I- and Q-signals thereform, first and second low-pass filters following the second matrix circuit and having different frequency passbands for the I- and the Q-signal respectively, a modulator circuit following the filters for quadrature modulation of a chrominance subcarrier by the frequency-limited I- and Q-signals and a first superposition circuit following the modulator circuit for forming a chrominance signal from the modulated signals, the coding circuit further comprising a second superposition circuit for inserting a burst-gate signal into the series arrangement for obtaining a chrominance signal occurring at a coding circuit output and having a burst of the chrominance subcarrier during a standardized period of time, characterized in that the second superposition circuit for inserting the burst-gate signal is coupled to the second matrix circuit which is in turn coupled to the subsequent low-pass filters in the series arrangement, the duration of the inserted burst-gate signal being longer than the standardized duration of the chrominance subcarrier burst in the chrominance signal at the coding circuit output with the occurrence of the pulse leading edge of the burst-gate signal in the line blanking period being advanced, the coding circuit incorporating a signal blanking circuit having a first input for receiving the chrominance signal produced by the first superposition circuit, a second input for receiving a blanking signal which is active in a standardized line blanking period outside the standardized duration contained therein for the chrominance subcarrier burst, and an output connected to the coding circuit output for supplying the chrominance signal with the chrominance subcarrier burst during the standardized period of time.

2. A colour television coding circuit as claimed in claim 1, characterized in that the blanking signal comprises a pulse having a duration equal to the standardized duration of the chrominance subcarrier burst, the pulse leading edge and the pulse trailing edge having a predetermined pluse edge steepness which corresponds to the beginning and the end of the standardized envelope of the chrominance subcarrier burst.

3. A colour television coding circuit as claimed in claim 1 or claim 2, characterized in that the burst-gate signal to be applied to the second superposition circuit has a pulse the leading edge of which is present in the line blanking period prior to the standardized moment of occurrence of the leading edge of a standardized line synchronizing pulse, the coding circuit comprising a phase discriminator which is active once in every two line periods and which has a first comparison input for receiving the chrominance signal produced by the first superposition circuit, a second comparison input for receiving a line synchronizing signal having line synchronizing pulses, and an output connected to a control input of a line signal generator and a subcarrier oscillator coupled to said generator, said oscillator being present in the modulator circuit, respectively.

* * * * *